INVENTOR.
ANDREW J. FREEMAN

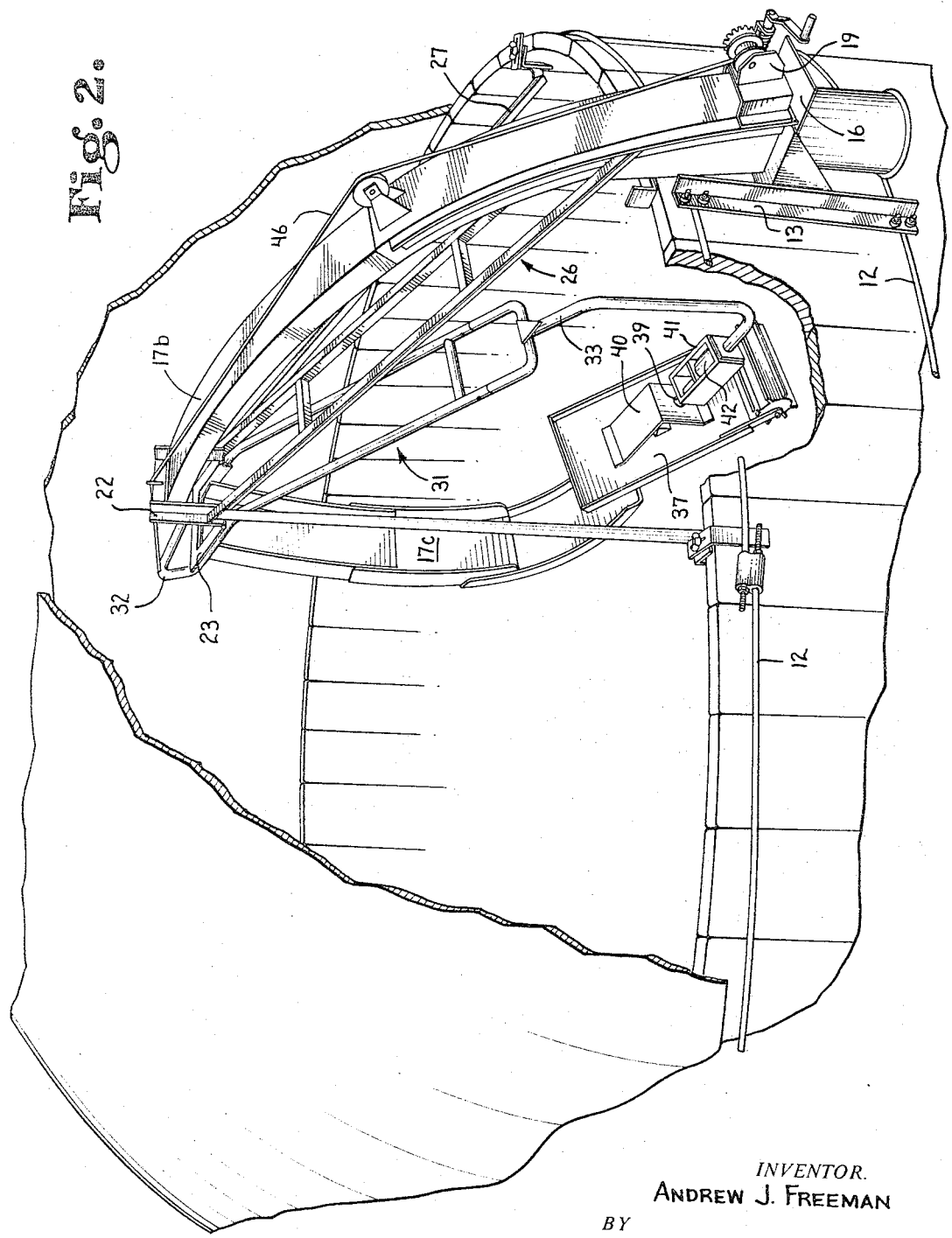

United States Patent Office 3,337,065
Patented Aug. 22, 1967

3,337,065
SILAGE DISTRIBUTOR
Andrew James Freeman, 705 Bexley Road,
West Lafayette, Ind. 47906
Filed Feb. 3, 1966, Ser. No. 524,682
6 Claims. (Cl. 214—17)

This invention relates generally to devices for distributing bulk material within a vertical circular storage tube, and in particular to a distributor for evenly loading silage within a silo.

In loading of silage into a silo the even, homogenous distribution of the material within the silo, as the loading proceeds, is quite important. The silage generally consists of components of differing weights and size, such as corn, cobs, leaves and stalks. Proper fermentation of the mixture with minimum spoilage requires that the component mixture be homogenous both vertically within the silo and over its cross-section. When the silage is merely blown in randomly from the top of the silo, the light, fluffy components are concentrated out at the peripheral area of the silo and a hard core of dense material builds up at the central area of the silo. This fills the peripheral area, the area of the silo's greatest capacity with light, fluffy material and thus reduces substantially the capacity of the silo to accommodate a maximum volume of silage. Acid bearing juices from the silage, under these conditions, drain down through this low density, peripheral area and contact the silo walls causing premature deterioration of the silo. Uneven loading around the center-line of the silo also places transverse loads on the silo, which can weaken and damage the silo structurally. The unloaders conventionally utilized to unload the silo contents give more satisfactory operation and have longer service life when the silage components are evenly distributed within the silo to provide an even feed texture.

The concept of the present invention meets these difficulties by loading the silo at its center with the silage being sprayed to the peripheral wall of the silo from a revolving distributor plate which, in effect, lays the silage down in a spiral as the silo fills. The result is a build up of material within the silo of homogenous, even texture, without any tendency to deposit a central, dense core and without accumulation of lighter materials at the periphery. The uniform packing results in even pressure on the silo walls, and drainage tends to be centrally through the column of silage to the silo drain normally located at the center of the silo base.

The structure of the present invention also utilizes an intermediately hinged distribution pipe which permits the pipe and the rotatable distribution head to be moved to a conveniently accessible position adjacent the silo wall. This hinged construction has the further advantage that it permits the silage distributor to be mounted on the silo as a permanent installation, the hinging of the structure to a stowed position obviating interference with the conventional silo unloader which operates down the central, vertical axis of the silo. Further, the hinged support for the distributing pipe and the motorized, rotating delivery head is such that the delivery head is not hung from the free end of the distribution pipe and the pipe need not, therefore, act as a support beam for the relatively heavy delivery head.

It is a primary object of the present invention to provide a silage distributor which lays down silage in a spiral configuration against the peripheral wall of the silo.

It is a further object of the present invention to provide a silage distributor having an intermediately hinged distribution pipe which permits moving of the distributor to a stowed or inspection position displaced from its radially extending, operating position.

It is a further object of the present invention to provide a silage distributor in which the end portion of the distributing pipe and the distributing head are supported independently.

These and other objects will become apparent as the description proceeds with reference to the accompanying drawings in which:

FIG. 2 is a perspective view similar to FIG. 1 but showing the apparatus dropped into stowed position.

Figure 1:
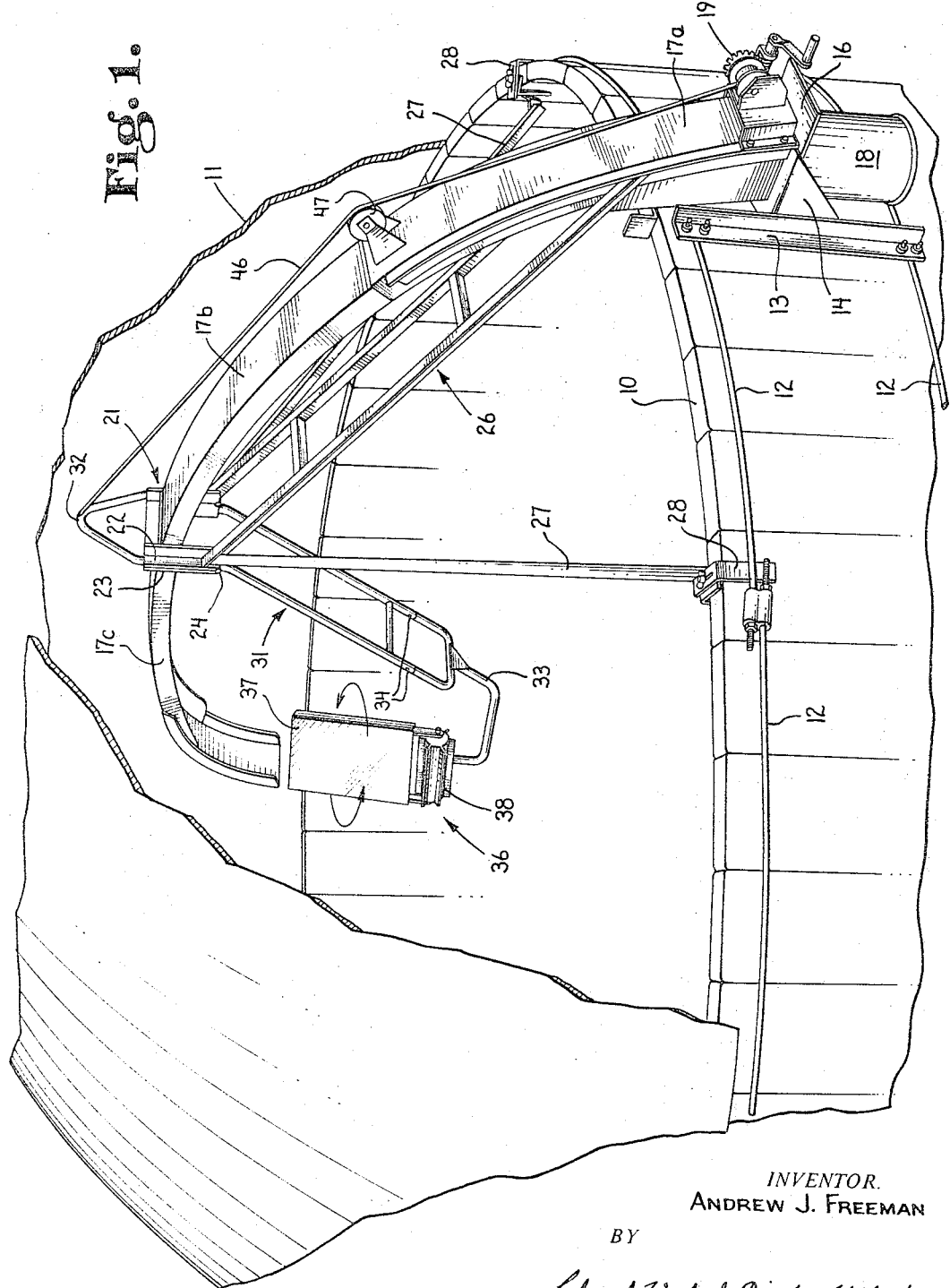
FIG. 1 is a perspective view of a silage distributing apparatus embodying the present invention and mounted on a silo.

Referring initially to FIG. 1, there is shown a conventional silo of cylindrical configuration and having sidewalls 10 and a roof (shown fragmentarily) identified at 11. The silo is provided with the conventional hoops 12 spaced along its length. Attached to the top two hoops 12 are angle irons 13 (only one of which is visible in FIG. 1). The angle irons carry gussets 14 which are attached to the generally rectangular flange 16 formed at the lower end of a fill pipe indicated generally at 17. The base section 17a of the fill pipe is generally rectangular in cross-section and totally enclosed, however, above the base section as will be evident from FIG. 2, the under portion of the fill tube is open, that is, it has an inverted channel shaped configuration. Attached to the lower end of the base section 17a, below the flange 16, is a section of cylindrical pipe 18 which receives material from the conventional blower pipe used for filling silos of the type here under consideration. A winch 19 is supported at the base of the fill pipe 17 and is preferably of the worm-gear type.

The fill tube 17 extends in a generally arcuate configuration over the upper end of the silo and has its free end located adjacent the central vertical axis of the silo. The tube 17 is hinged at 21, the hinge being formed by facing rectangular brackets 22 and 23 carrying hinge pintles 24 at their lower ends. An H-shaped brace, indicated generally at 26 extends from the base section 17a of the fill tube to the bracket 22 which is attached to the stationary portion 17b of the fill tube. Bracing means taking the form of support braces 27 are attached to the bracket 22 and extend to clamps 28 which anchor the braces on the margin of the silo at points spaced on opposite sides of the fill tube.

Rigidly secured to the bracket 23, and hence to the outer portion 17c of the fill tube, is a yoke or support member 31. One end of the yoke 31 extends above the brackets 22 and 23 as indicated at 32 and the opposite end of the yoke carries an extending member 33. The lower portion of the yoke, carrying the member 33, telescopes within the adjacent portions of the yoke and is fixed by pins 34, thereby permitting the lower portion of the yoke and the extending member 33 to be detached from the upper portion for repair or replacement of the distributor head, indicated generally at 36, carried by the member 33.

The member 33 extends so that the distributor head is situated adjacent the free end of the fill tube 17. The distributor head includes an inclined distributor plate 37 which has depending brackets supporting a freely rotating paddle wheel 38. As may best be seen in FIG. 2, the underside of plate 37 carries a bracket 40 which supports a member receiving a shaft 39, the bracket 40, and hence the plate 37 being rigidly attached to the shaft so as to rotate therewith. The shaft extends into a housing 41 which encircles a power means such as an electric motor 42. The housing 41 and the motor, shaft and distributor plate are all supported on the end of the member 33 forming a part of the support member. It will be understood that, as will be evident from FIG. 1, material moving from the end of the fill tube impinges upon the underlying, inclined distributor plate and slides down the plate and across the paddle wheel, causing the paddle wheel to rotate. As this occurs, the motor 42 rotates the distributor plate and paddle wheel assembly as indicated by arrows in FIG. 1.

A control means is provided for securing the fill tube in its position of FIG. 1 and permitting it to be dropped to its stowed position of FIG. 2 and this control means includes the winch 19, carrying cable 46 which passes over sheave 47 supported on brackets extending upwardly from the fill tube 17. The cable is rigidly attached to the portion 32 of the support member 31 which extends above the hinged joint of the support tube. By operating the winch, the outer end 17c of the support tube may be dropped to the position shown in FIG. 2 thus clearing the central portion of the silo for operation of the conventional unloading device which, conventionally, when in operation, moves centrally down through the silo. The hinged construction of the fill tube thus permits the distributor assembly to be a permanent part of the silo and need not be dismantled and removed after filling has been completed and before the conventional unloading device (not shown) can be placed in operation. This moving of the apparatus to stowed position also permits inspection and removal or replacement of the drive motor and associated parts of the distributor head from the exterior of the silo.

The supporting arrangement for the distributor head and the portion 17c of the fill tube is such that the relatively heavy distributor head is supported independently of the outer portion 17c of the fill tube rather than being suspended from the end of the tube so that the tube must act as a support beam for the distributor head as is typical of the prior art structures. Rotation of the distributor head as material falls from the end of the distributor tube serves to lay the incoming material in a spiral pattern against the outer wall of the silo this producing the homogeneous distribution of material within the silo as previously described.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A silage distributing apparatus for depositing silage from a central point adjacent the upper end of a silo, said apparatus comprising a fill tube having a generally arcuate configuration and supported at one of its ends adjacent the upper margin of the silo and extending generally radially across the top of the silo to locate the free end of said fill tube adjacent the central vertical axis of the silo, the supported end of said fill tube being adapted to receive silage with the silage moving through the fill tube and exiting at the free end thereof, said fill tube being hinged intermediate its ends to permit the outer portion of said fill tube to be dropped below the stationary portion, a support member secured to said fill tube outer portion adjacent said hinge, said support member extending below and at an acute angle with said outer fill tube portion to place the free end of said support member adjacent the free end of said fill tube, bracing means for the support member and fill tube junction which is independent of the silo support at the said one end of the fill tube, a distributor head carried by the free end of said support member including a distributor plate on which silage leaving the free end of the fill tube impinges and power means for rotating said distributor plate, and control means accessible from the exterior of the silo for breaking said fill tube at its hinge and thereby dropping the said outer fill tube portion and said support member to a stowed position in which the central area of the silo is cleared and the distributor head is accessible from the exterior of the silo.

2. A silage distributing apparatus as claimed in claim 1 in which said fill tube has an inverted channel configuration in cross-section.

3. A silage distributing apparatus as claimed in claim 1 in which said bracing means comprises members extending from the fill tube support member junctional area to the points on the silo margin spaced on opposite sides of said one end of the fill tube supported on the silo.

4. A silage distributing apparatus as claimed in claim 1 in which said power means rotates said distributor plate on a generally vertical axis.

5. A silage distributing apparatus claimed in claim 1 in which said support member has a portion extending above said fill tube, and said control means includes a winch having a cable attached to said portion of the support member above said fill tube.

6. An apparatus for distributing finely divided material within a receptacle, said apparatus a fill tube having a generally arcuate configuration and supported at one of its ends adjacent the upper margin of the receptacle, said fill tube being hinged intermediate its ends to permit the outer portion to be dropped below the stationary portion, a support member secured to said fill tube outer portion adjacent said hinge, said support member extending at an acute angle with said outer fill tube portion, means for bracing the support member and fill tube junction on the receptacle independently of the support for said stationary portion of the fill tube, a distributor head carried by the free end of said support member on which material from said fill tube impinges, and control means for breaking said fill tube at its hinge and thereby dropping the said outer fill tube portion and said support member to a stowed position.

References Cited
UNITED STATES PATENTS

| | | | |
|---|---|---|---|
| 2,257,572 | 9/1941 | Radue | 302—60 |
| 2,788,115 | 4/1957 | Friedman | 198—128 |
| 2,834,483 | 5/1958 | Friedman | 214—17 |

GERALD M. FORLENZA, *Primary Examiner.*

ROBERT G. SHERIDAN, *Examiner.*